H. HESS.
BALL HOLDING CAGE FOR BALL BEARINGS.
APPLICATION FILED JAN. 21, 1909.
1,071,738.
Patented Sept. 2, 1913.
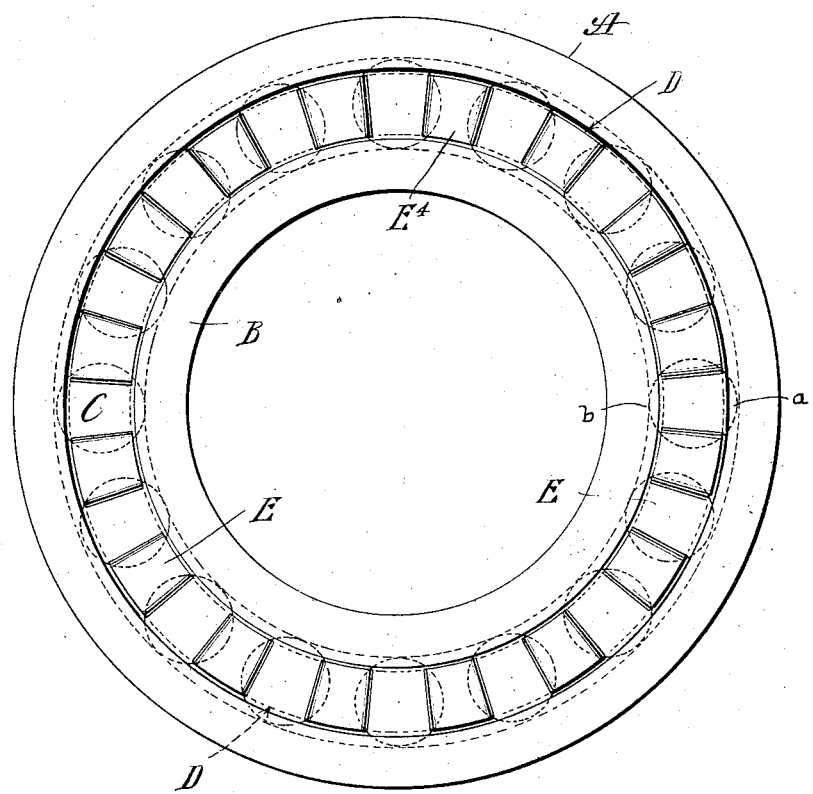
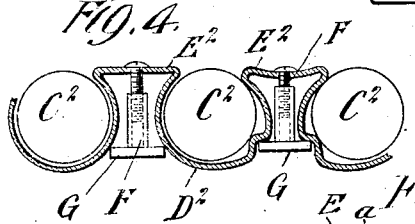
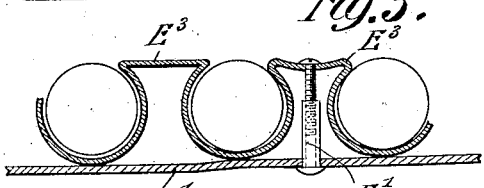
Witnesses:
Inventor:
HENRY HESS,
By his Attorneys

UNITED STATES PATENT OFFICE.

HENRY HESS, OF WAWA, PENNSYLVANIA, ASSIGNOR TO THE HESS-BRIGHT MANUFACTURING COMPANY, OF PHILADELPHIA, PENNSYLVANIA, A CORPORATION OF DELAWARE.

BALL-HOLDING CAGE FOR BALL-BEARINGS.

1,071,738.

Specification of Letters Patent. Patented Sept. 2, 1913.

Application filed January 21, 1909. Serial No. 473,455.

*To all whom it may concern:*

Be it known that I, HENRY HESS, a citizen of the United States, residing at Wawa, in the county of Delaware and State of Pennsylvania, have invented certain new and useful Improvements in Ball-Holding Cages for Ball-Bearings, of which the following is a specification, reference being had therein to the accompanying drawing.

My invention relates to ball holding cages for ball bearings, and more particularly to a form thereof which may be readily located in assembled position and caused to engage and hold the balls.

To these ends it consists in constructing the cage of a continuous strip of deformable material, whereby in the assemblage of the bearing it may be made to surround and hold the balls.

More specifically, the strip is provided with loops, which when placed in position loosely embrace the balls, and which loops by deformation may be made more closely to surround and to securely hold them. In one form of my invention, I provide the strip with means connected thereto, whereby it may be deformed in the manner stated. This cage is applicable to bearings both of the thrust and radial type, and I have shown both species in the accompanying drawing. Obviously, it may be employed in many ways without departing from the spirit of the invention, and I desire to be understood that it is not limited to any specific form or arrangement of parts, except in so far a such limitations are specified in the claims.

Referring to the drawing: Figure 1 is a side view of a radial bearing having applied thereto a cage embodying my invention. Fig. 2 is a side view of a thrust bearing provided with my improved cage. Fig. 3 is a fragmentary detail view of the cage showing the relation of the balls to the cage after deformation of the latter. Figs. 4 and 5 are similar views of modified forms of construction.

Referring to Figs. 1 and 3, the bearing comprises the plate or casing member A, and the plate or casing member B, formed respectively with tracks or ways $a$, $b$, wherein are located the rolling elements or balls C. These balls are spaced and held in position by means of the cage D, which is the subject-matter proper of my invention.

The cage D is composed of a continuous strip of some suitable material which may be readily deformed or bent to cause it to engage the balls. It is ordinarily of circular shape to correspond to the configuration of the bearing and the rolling elements located therein, and is formed with loops E, which loops are so located as to pass between and loosely embrace the balls when the ring is first inserted in position. After this operation, and due to the deformable character of the material of which the strip is composed, the loops E are formed as illustrated in Fig. 3. It is to be noted that by these means the balls are now properly spaced and held in position, and that the cage similarly is permanently located and may not be removed without again deforming the loops E and reversing the operation already described.

I thus provide a cage which is extremely cheap and simple, both in point of manufacture and assemblage, and which completely meets the practical requirements, and moreover also allows the balls a certain amount of elastic play, as is desirable and essential in the correct operation of the bearing. As will be noted, also, the balls are not only spaced by the cage D and loops E, but each contacts with the cage at a plurality of points $e$ instead of throughout their periphery. Preferably and as shown, a portion of the loops between said contact-points tion of the loops between said contact-points $e$ is bowed to form a space $e^2$. The dimensional area of the space is such as to maintain a considerable portion of the surface of the loop normally out of contact with the ball, which reduces friction between the ball and loop to a minimum.

In Fig. 4, a modified form is illustrated, wherein the balls $C^2$ are surrounded and held by the loops $E^2$ of the ring $D^2$ in substantially the same manner as previously described, the distinction in this instance being that I provide a means for deforming the loops $E^2$, consisting of a tube and screw F, connected at one end to the loop $E^2$, and at the other to a plate G, located below and between two adjacent balls. Upon turning up the screw, the loop $E^2$ is deformed in the manner shown at the right of the figure, so that a four-point contact between the balls and cage is secured like that illustrated in Fig. 4.

In Fig. 5 another modification is shown substantially similar to that of Fig. 4, but wherein the loops E³ are connected by deforming means F¹ to a continuous annular plate or ring G¹. It will be noted that in this last figure the deformation of the cage results in a three-point contact with the balls, instead of the four-point contact illustrated in Figs. 3 and 4. In Fig. 2 a form of thrust bearing is shown illustrating the application of my invention to such bearings. In this instance, the balls C are surrounded and held by the cage D and loops E in the manner previously described, the sole distinction being that to adapt the cage to bearings of the thrust type, it is necessary to change the direction of the loops with reference to the main ring-curvature of the cage as a whole.

Obviously, my invention may be applied in many different forms, and these and many other variations and changes will suggest themselves to those skilled in the art without further particularization.

Having thus described my invention, its construction and mode of operation, what I claim and desire to secure by Letters Patent of the United States is as follows:

1. A ball-holding cage for ball-bearings composed of a continuous strip of deformable material, the strip being formed with loops extending between the balls and having a plurality of distinct points of contact with said balls, together with additional means between the loops to insure their contact with the balls.

2. A ball-holding cage for ball-bearings composed of a continuous strip of deformable material, the strip being formed with loops extending between the balls and having a plurality of distinct points of contact with said balls, together with connected means to deform the loops and to insure their contact with the balls.

3. A ball-holding cage for ball-bearings composed of a continuous strip of deformable material, the strip being formed with loops extending between the balls and having a plurality of distinct points of contact with said balls, and bowed away from the contained balls intermediate of the contact-points, together with additional means between the loops to insure their contact with the balls.

4. A ball-holding cage for ball-bearings composed of a single continuous strip of deformable material, the strip being formed with loops extending between the balls and beyond the diameters thereof, portions of each loop being bowed away from adjacent contacting balls to present at each side of each of the contacting balls a plurality of distinct points of contact therewith and leaving between the contact-points an area of material unengaged by said contacting balls.

In testimony whereof I have affixed my signature in presence of two witnesses.

HENRY HESS.

Witnesses:
THEO. H. MCCALLA,
NETTIE L. HAHN.

---

Copies of this patent may be obtained for five cents each, by addressing the "Commissioner of Patents, Washington, D. C."